Aug. 28, 1951     A. L. HIGHBERG     2,565,558
SHAFT COUPLING
Original Filed March 25, 1944     2 Sheets-Sheet 1
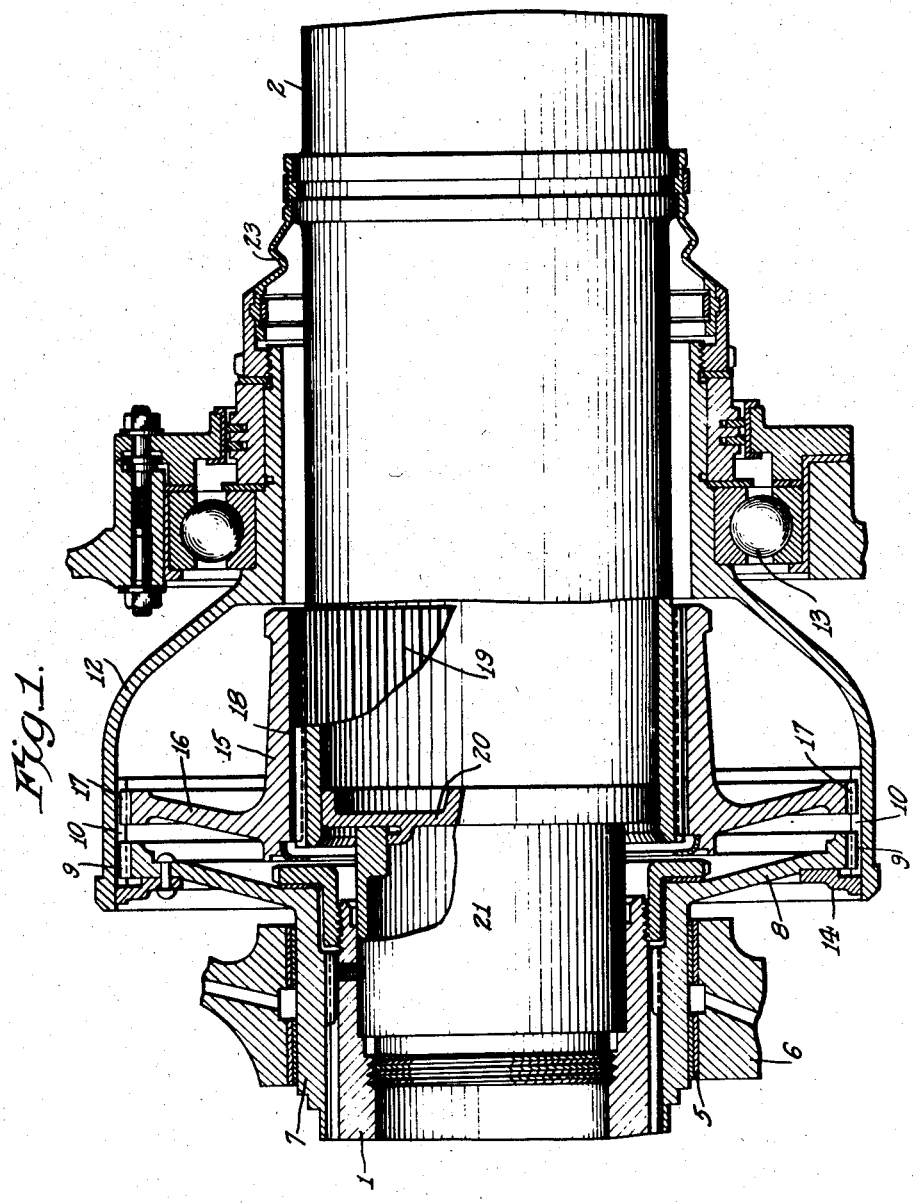
INVENTOR.
AXEL L. HIGHBERG
BY
John C. Kerr
ATTORNEY Aug. 28, 1951     A. L. HIGHBERG     2,565,558
SHAFT COUPLING
Original Filed March 25, 1944     2 Sheets-Sheet 2
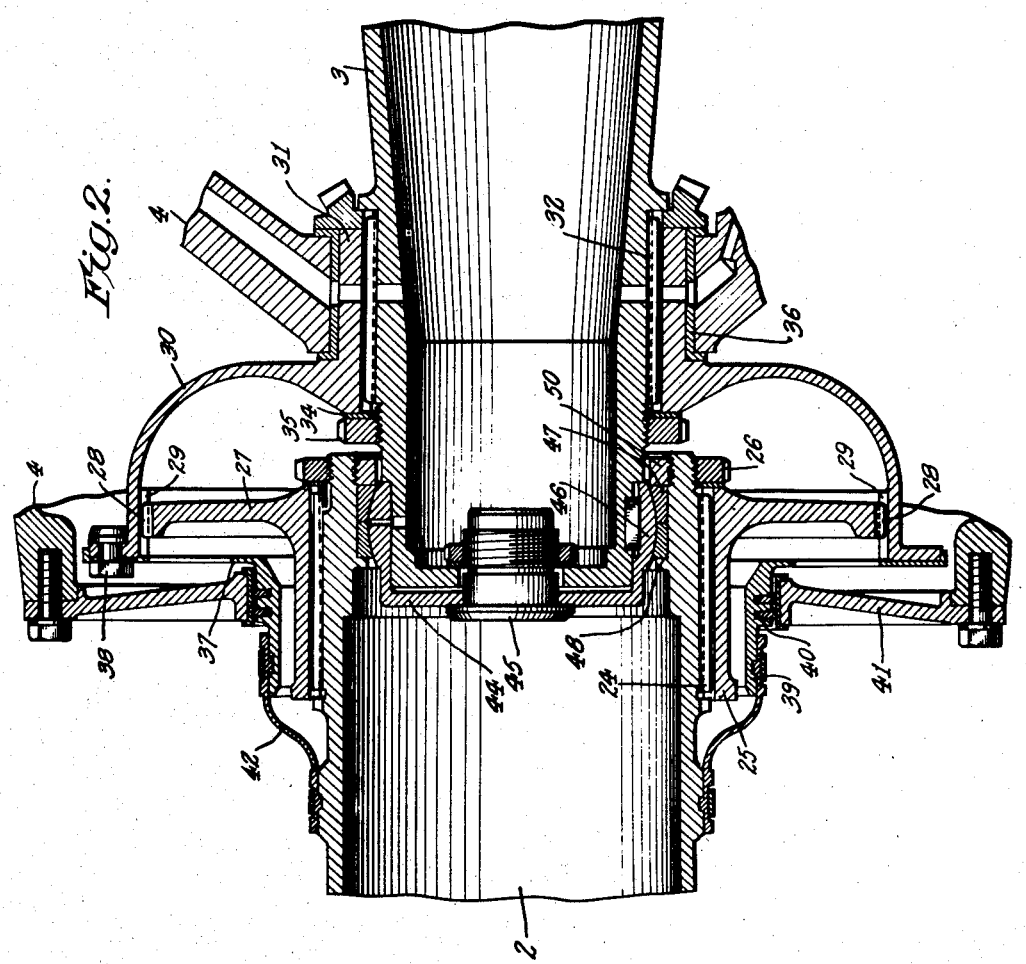
INVENTOR.
AXEL L. HIGHBERG
BY
John C. Kerr
ATTORNEY Patented Aug. 28, 1951

2,565,558

UNITED STATES PATENT OFFICE 2,565,558

SHAFT COUPLING

Axel L. Highberg, West Hartford, Conn., assignor to United Aircraft Corporation, East Hartford, Conn., a corporation of Delaware Original application March 25, 1944, Serial No. 528,081. Divided and this application November 27, 1946, Serial No. 712,481

4 Claims. (Cl. 64—9)

This application is a division of Highberg application S. N. 528,081, filed March 25, 1944, now abandoned.

This invention relates to power transmission systems and has for its object to provide a novel and improved shaft coupling which may be used to advantage in a wide variety of machines and is particularly adapted for application to an aircraft engine employing a reduction gear driven propeller where the distance from the engine to the gear box may be considerable.

Another object of the invention is to provide a flexible coupling between the crankshaft and gear reduction unit in a system of the above type, which is simple in construction and efficient in operation.

Another object is to provide an articulated crankshaft and extension power shaft or shafts for an aircraft engine or the like, including a novel combination of loose spline couplings and ball and socket supports, which provides freedom of universal movement and furthermore facilitates installation as well as disassembling of the parts.

Various other objects and advantages will be apparent as the nature of the invention is more fully disclosed.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Figures 1 and 2 are vertical sectional views which, when placed end to end with Fig. 1 at the left, show an engine crankshaft and power shaft assembly embodying my invention.

In the following description certain specific terms are used for convenience in referring to the various details of the invention.

The drawings show an articulated power transmission system comprising the crankshaft 1 of an aircraft engine and the axially aligned extension power shaft 2 which drives the third aligned shaft 3 connected to the reduction gear mechanism within the ogival gear box 4.

As shown in Fig. 1, the front end of the engine crankshaft 1 is supported in a bearing 5 carried by a portion of the engine crankcase 6. A cylindrical sleeve 7 having a dished flange 8 is splined onto the front end of the crankshaft and is supported in the bearing 5, the crankshaft being within the cylindrical portion of sleeve 7 and concentric therewith.

The flange 8 of sleeve 7 is provided with loose fitting peripheral (spline) gear teeth 9 engaging corresponding internal (spline) gear teeth 10 in a bell housing 12 which is supported in an outboard bearing 13, this spline coupling insuring flexibility between the connected parts. The flange 8 carries an annular centering ring 14 which maintains the bell housing 12 concentric with the sleeve 7 and the crankshaft 1.

The extension power shaft 2 extends through the bell housing 12 and is drivingly connected therewith through a cylindrical sleeve 15 having a flange 16 provided with loose fitting peripheral splines 17 which engage the internal splines 10 of the bell housing 12, providing flexibility to the extension shaft 2. The sleeve 15 is provided with splines 18 engaging corresponding splines 19 on the extension shaft 2, and the extension shaft is additionally supported on an internal bearing member 20 secured to the front end of the crankshaft 1 by a sleeve 21. The outer peripheral surface 20' of the member 20 is preferably curved or rounded off, or made spherical, in order to facilitate relative angular movement between the shaft 2 and the member 20. It will thus be evident that the extension shaft 2 is supported on the crankshaft 1 and is drivingly connected therewith but has freedom of universal movement with respect to the crankshaft so that all possibility of binding is eliminated.

A flexible dirt seal 23 is suitably connected between the extension shaft 2 and the engine case 10 to cover the opening therebetween.

As shown in Fig. 2, the forward end of extension power shaft 2 is splined at 24 and is provided with a correspondingly splined sleeve 25 secured thereon by means of a spanner nut 26. The sleeve 25 has a flange 27 provided with loose fitting peripheral (spline) gear teeth 28 engaging corresponding internal (spline) gear teeth 29 in a bell housing 30. The hub 31 of this bell housing is splined at 32 onto the cylindrical surface of extension shaft 3, providing a snug sliding fit, and is secured thereon by means of gasket 34 and spanner nut 35. The hub 31 is supported in a bearing 36 carried by a portion of the ogival gear box 4. It will thus be observed that rotary movement of extension shaft 2, which is driven by crankshaft 1, is imparted to the shaft 3 through the peripherally toothed flange 27 of sleeve 25 and the bell housing 30.

The end plate 37 of bell housing 30, secured thereto by bolts 38, has a cylindrical collar 39 which is journaled in a bearing 40 in the end plate 41 of gear box 4. A flexible dirt seal 42 is suitably connected between the extension shaft 2 and the collar 39 of the bell housing to cover the opening therebetween.

The forward end of shaft 2 telescopes over the adjacent reduced end of shaft 3 and is supported on said shaft 3 by the special ball and socket support shown in Fig. 2. The end of shaft 3 is capped by a cup-shaped member 44 which is secured thereto by a bolt 45, and the rim of this member 44 spanning the cylindrical surface of shaft 3 has a partly spherical bearing surface 46 forming part of the ball and socket support. The cooperating socket comprises a split ring 47 secured against an annular ledge 48 on the internal surface of shaft 2 by a spanner nut 50. This ball and socket support provides freedom of universal movement between the extension shafts 2 and 3.

In an aircraft power installation of the type referred to above, where the distance from the engine to the reduction gear box may range from ten to twenty feet, it is of course impossible to maintain the several articulated units of the power shaft in precise axial alignment, and it is essential that freedom of angular adjustment be provided to prevent binding and excessive wear. In my articulated crankshaft 1 and extension power shafts 2 and 3, the various loose spline couplings, in combination with the ball and socket support 46—47, allow the shaft members sufficient angular freedom of movement under all operating conditions.

Another practical advantage of the foregoing construction is that it enables the extension shafts 2 and 3 to be readily assembled and disassembled. This not only greatly facilitates installation but it also enables the extension shafts to be withdrawn from the engine if the remote gear box and propeller are dropped from the aircraft to allow the pilot to escape from a pusher installation.

Although a specific embodiment of the invention has been shown for purposes of illustration it is to be understood that the invention is capable of various modifications and adaptations which will be readily apparent to a person skilled in the art. The invention is only to be limited in accordance with the scope of the appended claims.

What is claimed is:

1. A shaft coupling comprising, a driving shaft, a coupling member splined thereto, a bearing rigidly supporting said coupling member, a driven shaft, a coupling member splined thereto, a bell housing around said driven shaft and coupling members, a bearing rotatably supporting said bell housing at one end independently of said driven shaft, said coupling members each having a flange extending therefrom externally splined, said bell housing having internal splines engaging the external splines of said flanges thereby torsionally connecting said driving shaft to said driven shaft, and a circular member secured to said driving shaft and engageably supporting said driven shaft.

2. A shaft coupling comprising, a driving shaft, a coupling member splined thereto, a bearing rigidly supporting said coupling member, a driven shaft, a coupling member splined thereto, a bell housing around said driven shaft and coupling members, a bearing rotatably supporting said bell housing at one end independently of said driven shaft, said first named coupling member having an annular centering ring attached thereto for insertion into the other end of said bell housing, said coupling members each having a flange extending therefrom externally splined, said bell housing having internal splines engaging the external splines of said flanges thereby torsionally connecting said driving shaft to said driven shaft.

3. A shaft coupling comprising, a driving shaft, a coupling member splined thereto, a bearing rigidly supporting said coupling member, a driven shaft, a coupling member splined thereto, a bell housing around said driven shaft and coupling members, a bearing rotatably supporting said bell housing at one end independently of said driven shaft, said first named coupling member having an annular centering ring attached thereto for insertion into the other end of said bell housing, said coupling members each having a flange extending therefrom externally splined, said bell housing having internal splines engaging the external splines of said flanges thereby torsionally connecting said driving shaft to said driven shaft, and a circular member secured to said driving shaft and engageably supporting said driven shaft.

4. A shaft coupling comprising, a driving shaft having a coupling member splined thereto, a bearing supporting said coupling member, a driven shaft having a coupling member splined thereto, a connecting member splined to each of said coupling members, a bearing supporting said connecting member, and a member attached to one shaft and extending into the other shaft for supporting one of said shafts from the other of said shafts while permitting limited relative angular movement therebetween.

AXEL L. HIGHBERG.

REFERENCES CITED

The following references are of record in the file of this patent:

UNITED STATES PATENTS

| Number | Name | Date |
|---|---|---|
| 1,865,950 | Petskeyes | July 5, 1932 |
| 2,151,834 | Bugatti | Mar. 28, 1939 |
| 2,277,369 | Shultz et al. | Mar. 24, 1942 |
| 2,286,444 | Smith | June 16, 1942 |

FOREIGN PATENTS

| Number | Country | Date |
|---|---|---|
| 119,109 | Great Britain | 1918 |
| 759,920 | France | 1933 |